United States Patent [19]

Snow

[11] Patent Number: 5,500,899
[45] Date of Patent: Mar. 19, 1996

[54] SECURE VOICE CONFERENCING APPARATUS

[75] Inventor: Brian D. Snow, Laurel, Md.

[73] Assignee: The United States of America as represented by the Director, NSA, Washington, D.C.

[21] Appl. No.: 382,270

[22] Filed: May 20, 1982

[51] Int. Cl.⁶ .................................................. H04L 9/14
[52] U.S. Cl. ............................................. 380/47; 380/49
[58] Field of Search ........................... 178/22.13–22.16, 178/22.19; 380/47, 49

[56] References Cited

U.S. PATENT DOCUMENTS

| | | | |
|---|---|---|---|
| 3,506,783 | 4/1970 | Mo et al. | 178/22.15 |
| 3,740,475 | 6/1973 | Ehrat | 178/22.19 |
| 3,798,359 | 3/1974 | Feistel | 178/22.15 |
| 3,876,832 | 4/1975 | Morgan et al. | 178/22.03 |
| 4,004,089 | 1/1977 | Richard et al. | 178/22.15 |
| 4,195,196 | 3/1980 | Feistel | 178/22.19 |
| 4,211,891 | 7/1980 | Glitz | 178/22.19 |
| 4,434,322 | 2/1984 | Ferrell | 178/22.14 |
| 4,467,139 | 8/1984 | Mollier | 178/22.16 |
| 4,484,027 | 11/1984 | Lee et al. | 178/22.15 |

*Primary Examiner*—Salvatore Cangialosi
*Attorney, Agent, or Firm*—John R. Utermohle; Thomas O. Maser

[57] ABSTRACT

A system for communicating simultaneous encrypted messages in a jamming environment with a low opportunity for depth exploitation. The system includes a plurality of transmitters, each having a high speed key generator for producing a plurality of pseudorandom bit streams. The bit streams are combined with a unique identifier in each transmitter to produce a single unique key stream, which may be added to a binary data stream to create an encrypted message for transmission. The receiver includes a single key generator identical to those in the transmitters and a plurality of combiners and correlators to enable simultaneous recovery of each transmitted encrypted message.

6 Claims, 3 Drawing Sheets

SECURE VOICE CONFERENCING APPARATUS

BACKGROUND OF THE INVENTION

1. Field of the Invention

My invention relates to the field of encrypted electronic communications, and more specifically to encrypted spread spectrum conference communications in a jamming environment without yielding usable depths.

2. Description of the Prior Art

A common use of spread spectrum systems in the prior art has been as a multiple access or selective address technique for communications among numbers of ground stations via a single satellite channel. A direct sequence spread spectrum system allows many signals to be transmitted on the same nominal carrier frequency and occupy the same radio frequency bandwidth. FIG. 1 illustrates such a system which might be used in a satellite link. A first transmitter, represented by a modulator 103 and mixer 104, sends a signal via satellite 105 to a receiver, represented by mixer 108 and demodulator 109. A second transmitter and receiver are also shown, and multiple paths are usual. A carrier signal $s_o(t) = A \cos \omega_o t$ is modulated with information in modulator 103 to produce a signal $s_1(t)$, where $$s_1(t) = A_1(t) \cos [\omega_o t + \phi_1(t)].$$

The modulated signal $s_1(t)$ is next linearly multiplied in mixer 104 by some other function of time $g_1(t)$. The function $g_1(t)$ is usually the function that spreads the energy of the modulated signal $s_1(t)$ over a bandwidth considerably greater than the bandwidth of $s_1(t)$.

The resulting twice-modulated signal, given by the product $g_1(t) \cdot s_1(t)$, is transmitted over a common channel such as a satellite link where it is linearly combined with the other signals in the system, i.e., $g_2(t) \cdot s_2(t)$, $g_3(t) \cdot s_3(t)$, ..., $g_n(t) \cdot s_n(t)$. All these signals have the same nominal carrier frequency.

The composite signal, formed by the sum of all signals $g_i(t) s_i(t)$ transmitted, is applied to the input of that receiver whose function is to extract the original signal $s_1(t)$ and reject all others. To do this the composite signal is multiplied in mixer 108 by an exact replica of $g_1(t)$. This process produces the following signal at the output of mixer 108:

$$g_1^2(t) \cdot s_1(t) + g_1(t) \cdot g_2(t) \cdot s_2(t) + g_1(t) \cdot g_3(t) \cdot s_3(t) + \ldots + g_1(t) \cdot g_n(t) \cdot s_n(t).$$

If the functions $g_i(t)$ can be chosen such that $g_1^2(t) = 1$ and cross products such as $g_i(t) \cdot g_j(t) = 0$ where $i \neq j$, then each demodulator would be able to perfectly extract its own signal and reject all others. The process just described is correlation, and useful approximations to functions having the necessary relationships may be produced by shift register sequence generators.

A well known method of binary data encryption involves the modulo-2 addition of a binary data stream to a key stream comprising a sequence of pseudorandom binary bits to produce a cipher stream. The cipher stream is transmitted to a receiver where it is modulo-2 added to an identical key stream with the result that the original binary data stream is reproduced. It is important to the security of such a system that no two data streams be encrypted with an identical key stream, because the addition of the two resulting cipher streams eliminates the key, leaving only the sum of the two data streams. Because of the highly biased nature of most data streams it is usually a simple process to separate the two and discover the information which was intended to be kept hidden. Cryptanalysts commonly refer to such a technique as depth exploitation. A depth refers to any repetition of a key stream, or a portion of a key stream, which permits an unauthorized recipient of the transmission to gain an insight into the manner in which the key was generated. Given a sufficient number of depths it is possible to reconstruct the method by which the key stream was generated and thereafter decipher all of the subsequent communications.

Depth exploitation has particular significance for conferencing systems in which it is intended that several persons be able to communicate over a common channel and at the same time. A typical military application might include a squadron of aircraft on a common mission. A business conference call poses a non-military situation where it might be desirable for several persons to converse on a common channel, and it is increasingly desirable that such calls be encrypted. The simple expedient of encrypting all messages in a conferencing network by means of a single common key results in the creation of depths any time two or more persons are talking at the same time. There is a need for a communications system which provides encrypted conferencing capabilities that do not exhibit a high potential for depth exploitation.

SUMMARY OF THE INVENTION

It is an object of my invention to provide simultaneous secure communications in a conferencing system without creating depths.

It is a further object to provide such a capability in an anti-jam environment.

A still further object is to provide simultaneous encipherment of multiple data channels in a common system, utilizing a distinct key stream for each channel.

Still another object is to utilize the desirable attributes of spread spectrum communications systems to provide encrypted anti-jam multiple channel communications.

A communication apparatus having these and other desirable features would include a transmitter comprising means for providing a first data stream; means for generating a first key stream; means for segmenting said first key stream into a first plurality of substreams; means for providing a first identifier; means for mixing said first identifier with said first substreams to provide a second key stream, and means for mixing said second key stream with said data stream to produce an encrypted stream. The apparatus would additionally include a receiver comprising means for receiving an encrypted stream; means for generating a third key stream identical to said first key stream; means for segmenting said third key stream into a second plurality of substreams; means for providing a second identifier identical to said first identifier; means for mixing said second identifier with said second substreams to provide a fourth key stream, and means for correlating said fourth key stream with said encrypted stream to provide a second data stream identical to said first data stream.

DESCRIPTION OF THE PREFERRED EMBODIMENT

Figure 2:
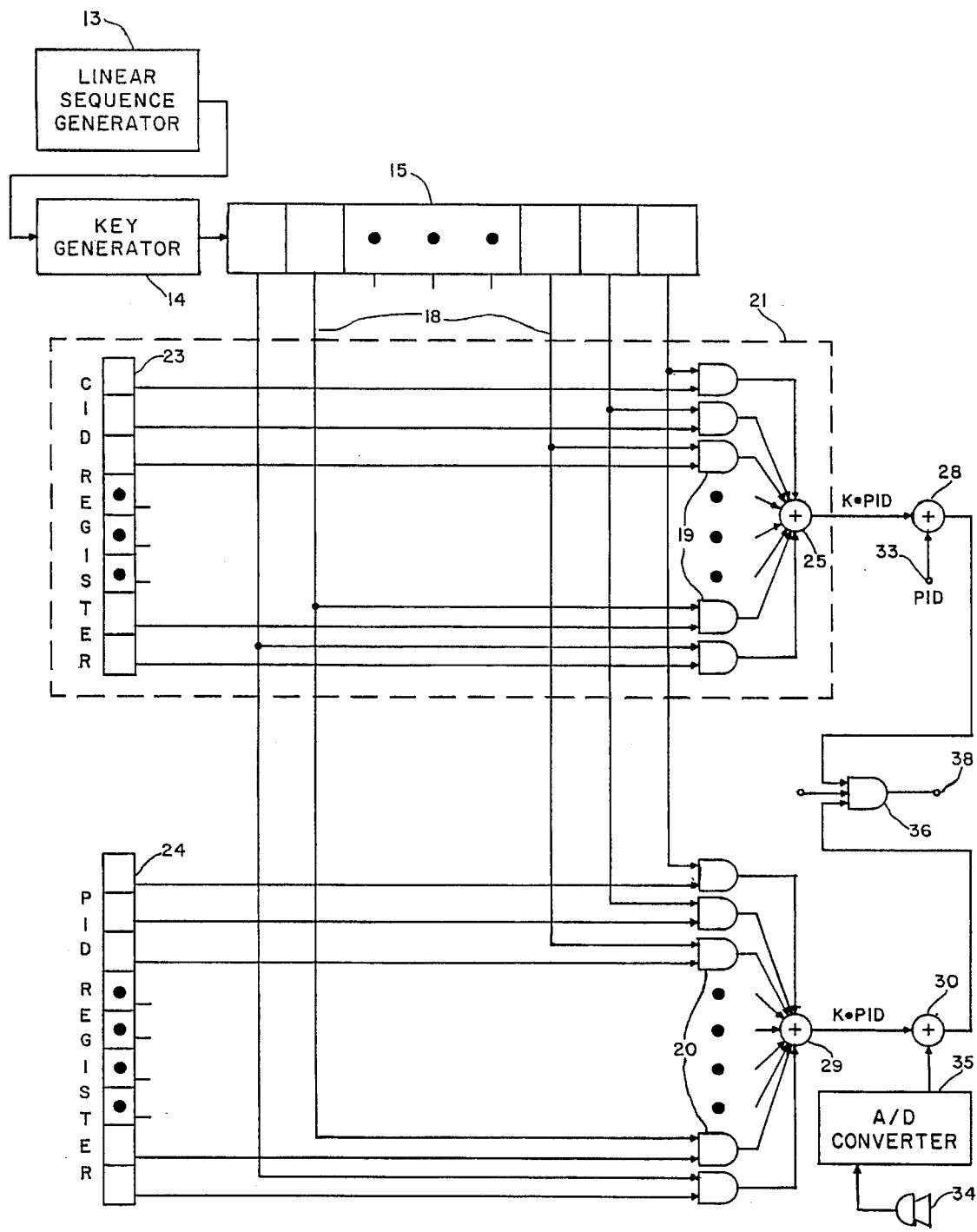
FIG. 2 is a block diagram of a transmitter including the features of my invention.

The transmitter of FIG. 2 includes a linear sequence generator 13 which provides a pseudorandom binary bit stream to a key generator 14. The key generator feeds a multistage serial shift register 15 having a plurality of output lines 18—18. A combining circuit 21 includes a plurality of AND gates 19—19, a multistage shift register 23, and a modulo-2 adder 25. Each of the lines 18—18 connects to one of the AND gates 19—19, and also to one of a second plurality of AND gates 20—20. Shift register 23 provides a parallel output to AND gates 19—19, and a similar multistage shift register 24 provides a parallel output to AND gates 20—20. ADDER 25 accepts an input from each of the AND gates 19—19 and provides an output to a modulo-2 ADDER 28. AND gates 20—20 each provide an output to modulo-2 ADDER 29 which is connected to modulo-2 ADDER 30. Terminal 33 connects to a second input of ADDER 28. A microphone or similar input source 34 connects to an analog-to-digital converter 35, which provides a second input to ADDER 30.

Linear sequence generator 13 may be configured in any of several ways. The construction and principle of operation of such devices are well documented in the prior art, for example, Petersen, Wesley W., *Error-Correcting Codes*, (New York: John Wiley & Sons, 1961), pp 118–123.

Key generator 14 may be configured in any of many well known conventional structures. The key generator will step at a high speed, providing a first key stream to n-bit shift register 15. Following every nth step of key generator 14, a timing pulse will be provided to gate the contents of register 15 onto lines 18—18 and into the AND gates 19—19 and 20—20. A first plurality of n substreams is thus created, with a unique substream present on each of the lines 18—18 and each substream containing every nth key bit emitted by key generator 14.

Each transmitter will be identified by a unique personal first identifier (PID). Each potential receiver must possess a second identifier identical to the first in order for communications to be established. The means by which the second identifier is provided to the receiver is discussed below. The PID is represented in binary form and stored in shift register 24. A binary "1" in any stage of PID register 24 will provide a continuous "1" input to the AND gate 20 to which that stage is connected, and a binary "0" in any stage of register 24 will provide a "0" to its corresponding AND gate 20. As substreams are gated out of register 15, each bit of key is input to a single AND gate 20. The output of that AND gate is the product of the bits presented, one from key register 15 and one from PID register 24. It should be apparent that the output from each of the AND gates 20—20 will be a "1" only when both the input from the PID register and the key substream are a "1". Binary ADDER 29 sums all of the outputs from AND gates 20—20 to create a second key stream which is routed to ADDER 30. This key stream is determined both by the output of key generator 14 and by the contents of PID register 24. It is thus possible to have many transmitters synchronized to produce identical key streams from their individual key generators, yet the ability to develop a common key stream at the output of ADDER 29 will be dependent on knowedge of a common identifier in register 24. This feature may be used to develop a variable net of transmitters capable of generating a common key for communications.

The outputs of register 15 are similarly routed to the plurality of AND gates 19—19, as are the stages of register 23. Register 23 contains a third identifier (CID) which would be held in common by all transmitters within the variable net. The output of ADDER 25 is thus determined both by the contents of register 23 and by the substreams on lines 18—18. Several transmitters generating common substreams on lines 18—18 may generate a common key stream at the output of ADDER 25 so long as they each possess an identical common identifier in register 23. Each transmitter will have a unique bit stream at the output of ADDER 29 if each has a unique personal identifier in register 24.

A two-input mod-2 ADDER 28 receives a first input from ADDER 25 and a second input from terminal 33. Two-input ADDER 30 sums the outputs of ADDER 29 and a first data stream from analog-to-digital converter 35 or a similar source. A means of providing data into the structure is typified by microphone 34. A gate 36, activated by a switching signal from a conventional source (not shown), provides a means by which the output of ADDER 28 or ADDER 30 may be selectively routed to output terminal 38 for transmission to a receiver.

Figure 3:
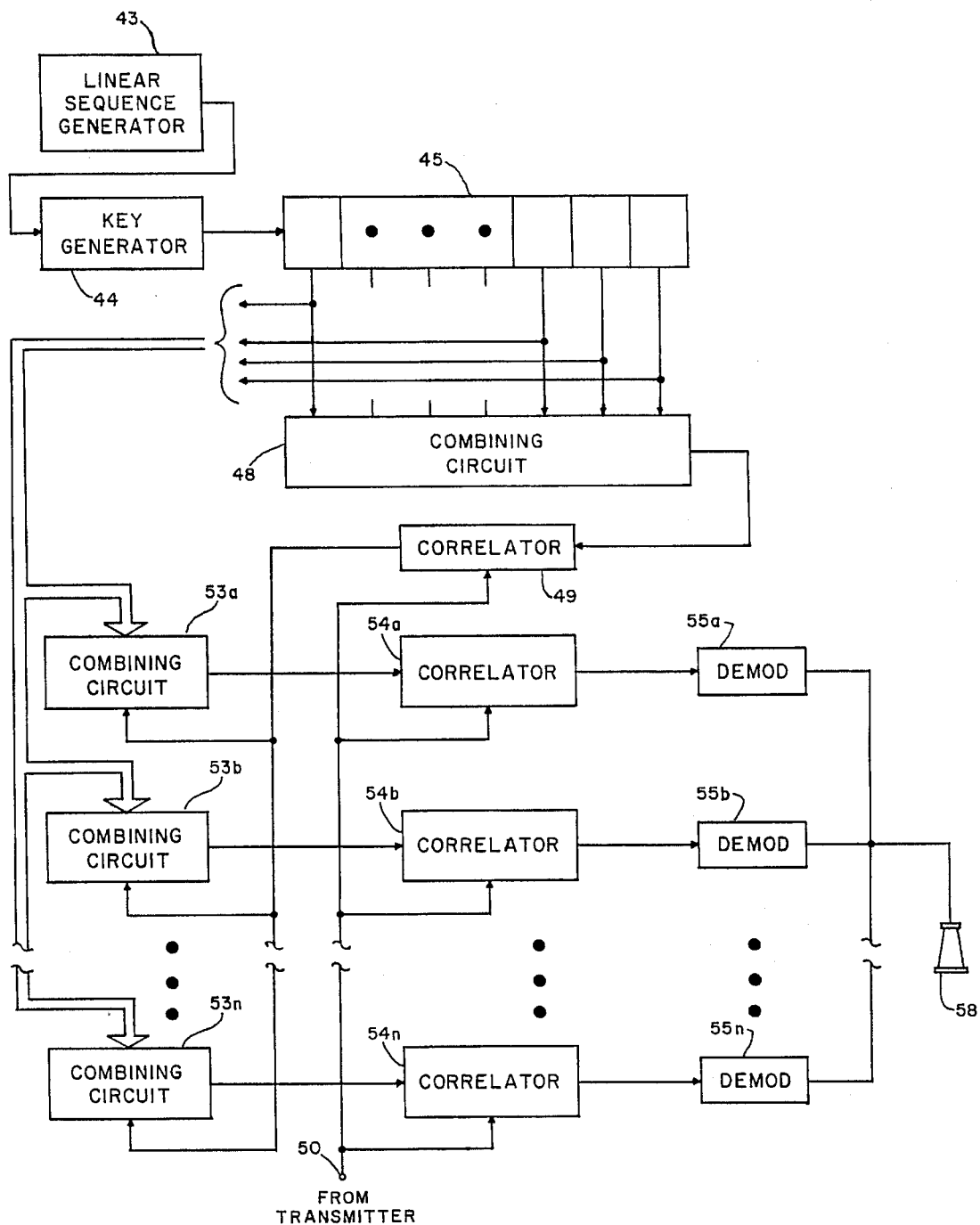
FIG. 3 is a block diagram of a receiver including the features of my invention.

The receiver of my invention is shown in FIG. 3. It includes a linear sequence generator 43, a key generator 44 and a shift register 45, all of which are identical to those in the transmitters. The output of key generator 44 is a third key stream which must be identical to and in synchronism with the first key stream from key generator 14 in the transmitter. A combining circuit 48, configured in an identical manner to circuit 21 in the transmitter, combines the CID and the substreams from register 45. It should be readily apparent that if the transmitter and receiver each possess an identical CID and identical key generator outputs, the output of combining circuit 48 will be the same as the output of combining circuit 21.

Figure 1:
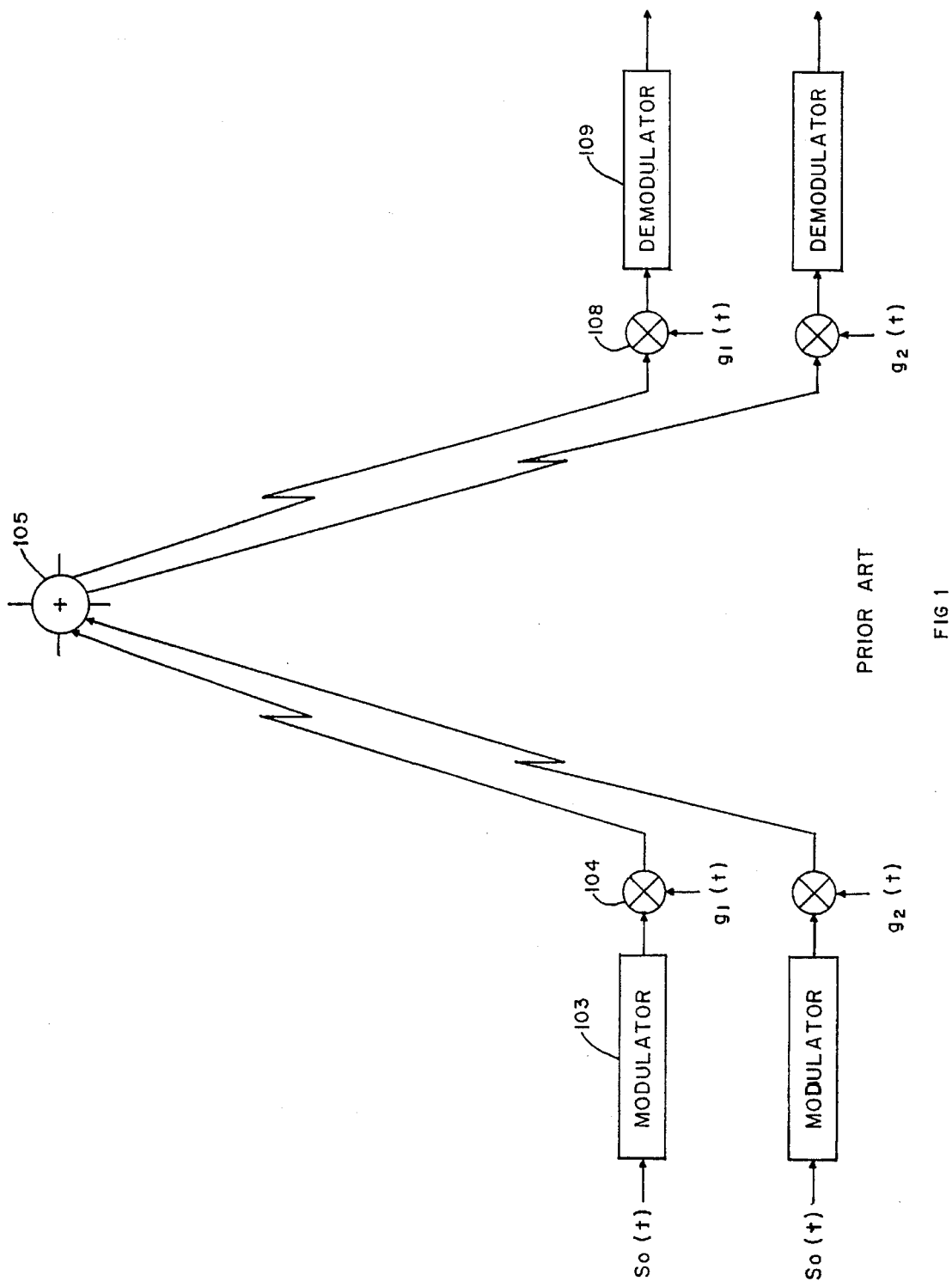
FIG. 1 illustrates a spread spectrum communications system typical of those known in the prior art.

A correlator 49 receives an encrypted data stream from the transmitters, provided to terminal 50, as well as key from combining circuit 48. The function of correlator 49 is to recover the encrypted PID's preceeding each communication and to provide the recovered PID to an unused one of the available combining circuits 53a–53n. The receiver will contain a group of circuits 53a–53n equal in number to the maximum possible simultaneous messages desired. Each combining circuit 53a–53n will be configured the same as circuit 21 of the transmitter of FIG. 1, and will have as inputs a PID from correlator 49 and the substreams from register 45.

A plurality of correlators 54a–54n, equal in number to the number of combining circuits 53a–53n, each take a first input from a circuit 53a–53n and a second input from the data input 50. Each correlator 54a–54n feeds a demodulator 55a–55n and each demodulator provides an input to the output device 58.

Communication is possible with my invention when all transmitters in a net possess an identical CID and when all key generators are stepping synchronously with an identical output. Voice or other data at a source such as microphone 34 in any transmitter is digitized by an analog to digital converter 35 and modulated in some conventional manner. Circuitry (not shown) is provided in the transmitter to detect the activity at source 34 and to cause that transmitter's PID to be supplied to terminal 33. The PID is added by ADDER 28 to the key output from ADDER 25, and the encrypted PID is transmitted to the receiver from output terminal 38. In the receiver, the encrypted PID is received on terminal 50 and routed to correlator 49 where it is decrypted by a conventional correlation process. The PID is inserted into an unused one of the combining circuits 53a–53n to await forthcoming message data. For purposes of explanation, it will be assumed that the first received PID is inserted into combining circuit 53a.

Following the transmission of the encrypted PID, the transmitter encrypts message data from A/D converter 35 by adding it to the key stream from ADDER 29. The encrypted message data is switched to output terminal 38 from where it is transmitted to the receiver. Data received at terminal 50 is routed to correlators 54a–54n. Combining circuit 53a combines the previously received PID with the multiple key streams from register 45 which are identical to the output of circuit 21 in the transmitter. Correlator 54a outputs the unencrypted data stream which may be demodulated, digital-to-analog converted, and provided to speaker 58.

An encrypted PID received from a second transmitter would be similarly decrypted by correlator 49 and provided to combining circuit 53b. Correlator 54b would extract the message from the received data stream and the demodulated message would be provided to speaker 58. Additional transmissions would be received and decrypted in the same manner.

The above description is of a preferred embodiment in which variable net capability is desired. If no such capability is necessary, the common identifier (CID) would be unnecessary and combining circuit 21 could be eliminated entirely from the transmitter. In such case, combining circuit 48 and correlator 49 would be unnecessary in the receiver. The personal identifiers could then be permanently stored within the combining circuits 53a–53n.

Depth protection inherently results in my invention from the fact that a depth is possible only when the PIDs of several simultaneous transmissions form a linearly dependent set of vectors over GF(2). The problem of avoiding depths becomes one of appropriately assigning PIDs. If permissible PIDs are restricted to vectors of odd density, for example, any set of three or fewer PIDs must be linearly independent. Four PID's selected at random from $2^{n-1}$ vectors would be linearly independent with probability $$p = \frac{4}{2^{n-1}} - 3.$$

Protection against intentional jamming is inherently provided in spread spectrum communications, and those benefits inure to this system as well.

I claim:

1. In a secure digital conferencing communications apparatus wherein each of a plurality of messages is encoded with a distinct key and then combined for simultaneous communication over a common channel, (a) a plurality of transmitters, each comprising:
means for generating a common, synchronous first key stream;
means for providing a unique identifier;
means for mixing said unique identifier with said first key stream to provide a first unique key steam;
means for providing a first data stream, and
means for mixing said unique key stream with said data stream to produce a unique encrypted stream, (b) transmission means for combining a plurality of said encrypted streams and for communicating them simultaneously over a common channel, and (c) a plurality of receivers, each comprising:
means for receiving said combined encrypted streams;
means for generating a common second key stream identical to and in synchronism with said first key stream;
means for providing all of said unique identifiers;
means for mixing each of said unique identifiers with said second key stream to provide a plurality of second unique key streams, each identical to each of said first unique key streams, and
means for correlating each of said second unique key streams with said combined encrypted stream to provide a plurality of second data streams, each identical to each of said first data streams.

2. The apparatus of claim 1 wherein said means for mixing said unique identifier includes shift register means for segmenting said first key stream into a plurality of substreams.

3. The apparatus of claim 2 wherein said means for providing said unique identifiers are shift registers.

4. The apparatus of claim 1 wherein said means for mixing said unique identifier and said first key stream in said transmitter includes a plurality of 2-input AND gates, each AND gate receiving a first input from a single stage of the shift register containing said identifier and a second input from a single stage of the shift register comprising said segmenting means, and an adder to sum the outputs of the AND gates.

5. The apparatus of claim 4 wherein said means for mixing said unique key stream in said transmitters with said data stream is an adder.

6. The apparatus of claim 5 wherein said transmitter further comprises:
means for providing a common identifier;
means for mixing said common identifier with said first key stream to provide a common key stream, and
means for mixing said common key stream with said first identifier to produce an encrypted identifier, and
wherein said receiver further comprises:
means for receiving an encrypted identifier, and
means for correlating said plurality of second unique key streams with said encrypted identifier to provide an identifier identical to said common identifier.

* * * * *